April 4, 1961 H. U. LIEBERHERR 2,977,943
SUPERCHARGED OPPOSED PISTON ENGINES
Filed March 23, 1955 3 Sheets-Sheet 1
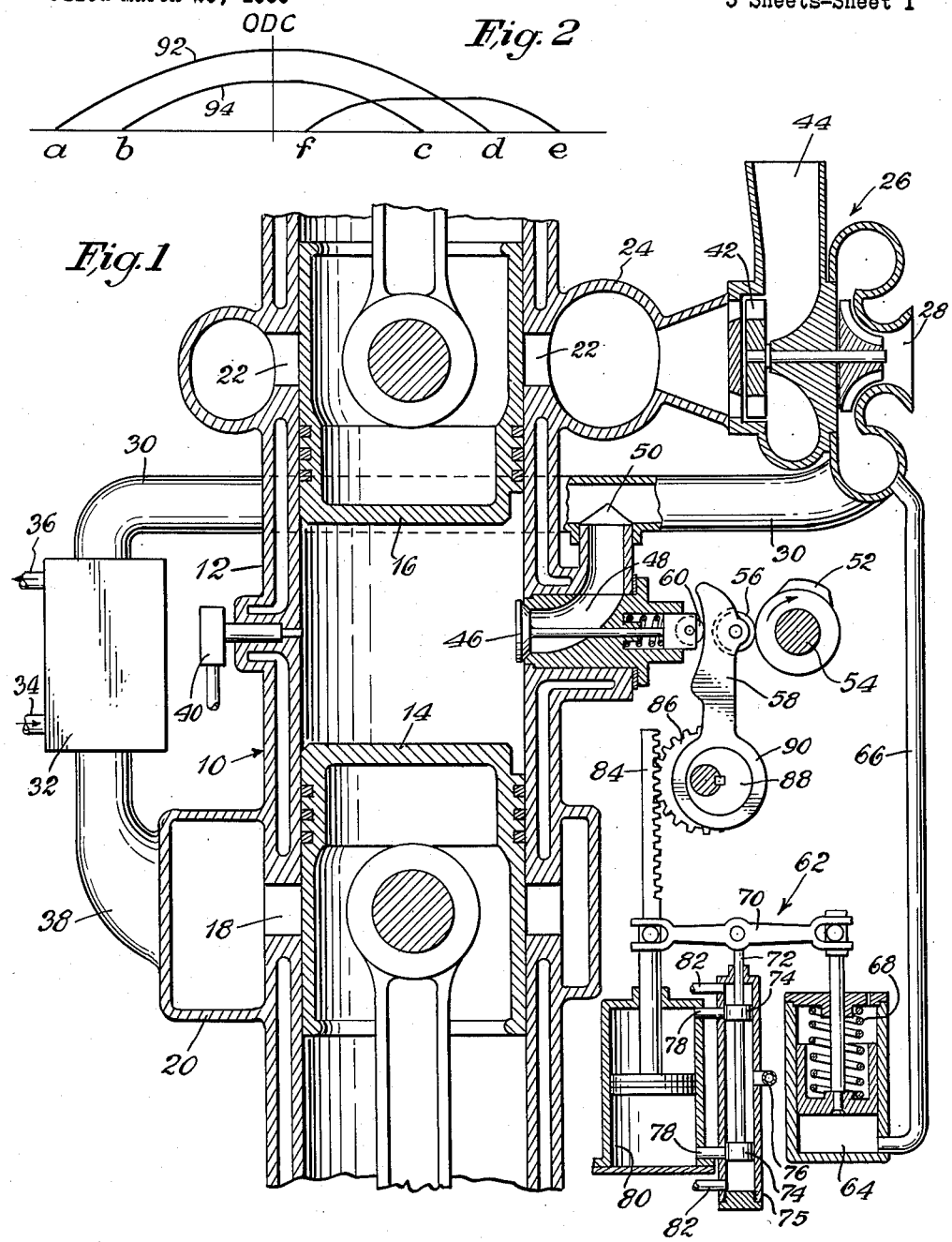
Inventor
Hans U. Lieberherr
by Parker & Carter
Attorneys

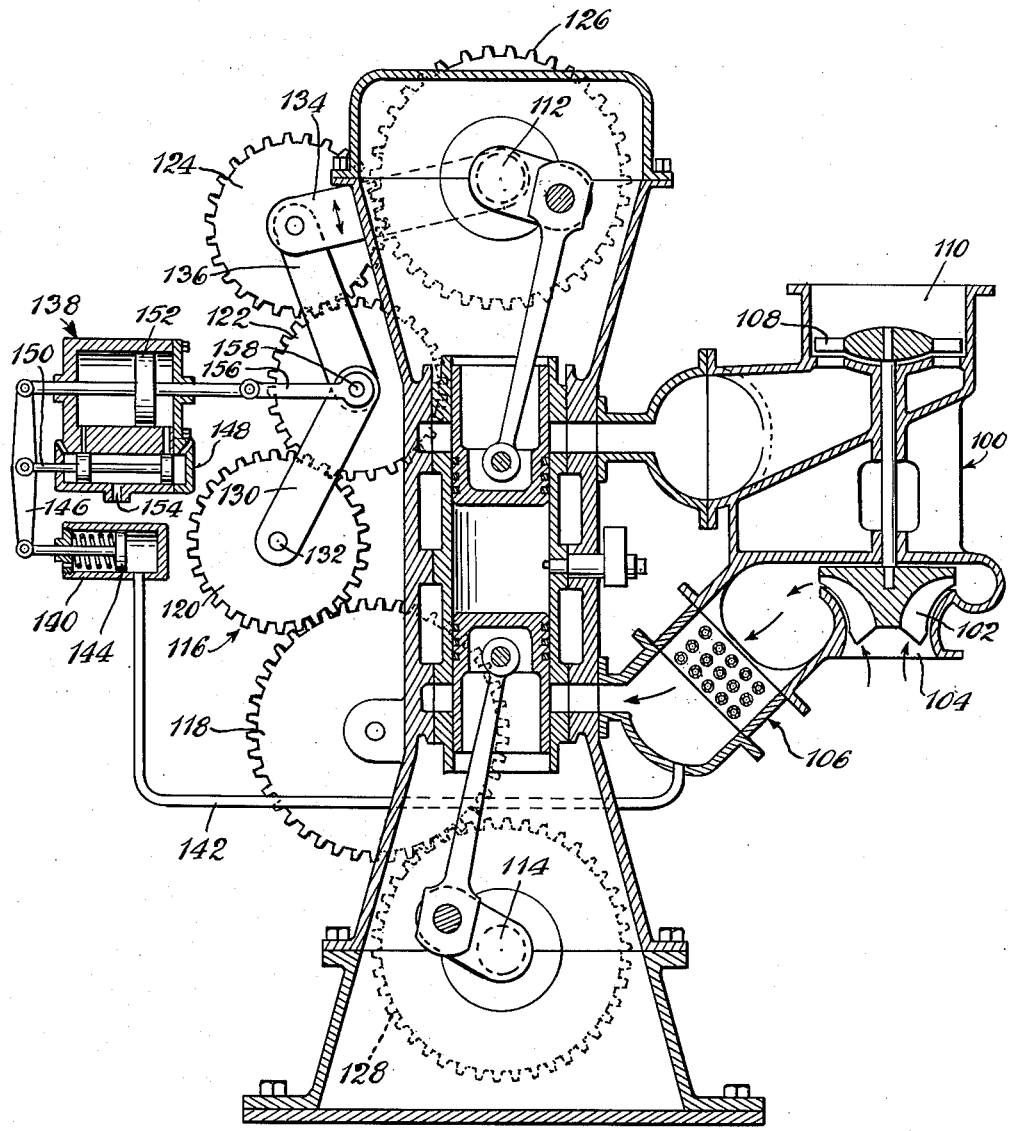

April 4, 1961  H. U. LIEBERHERR  2,977,943
SUPERCHARGED OPPOSED PISTON ENGINES
Filed March 23, 1955  3 Sheets-Sheet 3

Inventor
Hans U. Lieberherr
by Parker & Carter
Attorneys

United States Patent Office 2,977,943
Patented Apr. 4, 1961

2,977,943

SUPERCHARGED OPPOSED PISTON ENGINES

Hans U. Lieberherr, Milwaukee, Wis., assignor to Nordberg Manufacturing Company, Milwaukee, Wis., a corporation of Wisconsin Filed Mar. 23, 1955, Ser. No. 496,166

2 Claims. (Cl. 123—51)

This invention resides in the field of internal combustion engines and is an improved type or form of engine and an improved method of operating an engine. More specifically, the invention relates to an opposed piston engine, although many of its inventive aspects and features are not necessarily limited to this specific type.

A primary object of my invention is a new and improved method of operating an opposed piston engine over a selected load range so as to provide a maximum combustion space with a minimum entrapped volume in the cylinders at the maximum load within the range, and to provide a minimum combustion space with a maximum entrapped volume at the minimum load within the range.

Another object is a method of operating an opposed piston engine so as to reject or return a predetermined quantity or amount of air from the cylinders to the inlet side to reduce the volume of air entrapped in the cylinders.

Another object is an opposed piston engine with means for controlling its operation so that it will carry more load without exceeding its maximum safe thermal stresses.

Another object is an opposed piston engine constructed so that the maximum compression pressures can be controlled over a selected load range.

Another object is an opposed piston engine with means for returning a predetermined quantity of air from the cylinder during the compression stroke of the pistons to the inlet manifold or inlet side.

Another object is a supercharged, intercooled, opposed piston engine with a compression control valve in the cylinder or cylinders to provide for the rejection of a predetermined quantity of air from the compression space to a point in the inlet side.

Another object is an opposed piston engine of the above type constructed so that the rejected or returned air from the compression space will again be cooled before it is admitted to the cylinder again.

Another object is a supercharged, intercooled, opposed piston engine with means for varying the phase angle between the drive shafts over a selected load range so that at full load, a minimum volume of air will be entrapped between the pistons and a maximum combustion space will be provided.

Another object is a method of operating an opposed piston engine in a selected load range so that the weight of air entrapped for compression will vary in direct relation to the load in the range.

Other objects will appear from time to time in the ensuing specification and drawings in which:

Figure 1 is a schematic sectional view of an opposed piston engine illustrating one form of my invention;

Figure 2 is an example of a port timing diagram applicable to an engine with my invention;

Figure 3 is one alternate timing diagram;

Figure 4 is a schematic sectional view of an opposed piston engine showing a variant form of my invention;

Figure 5:
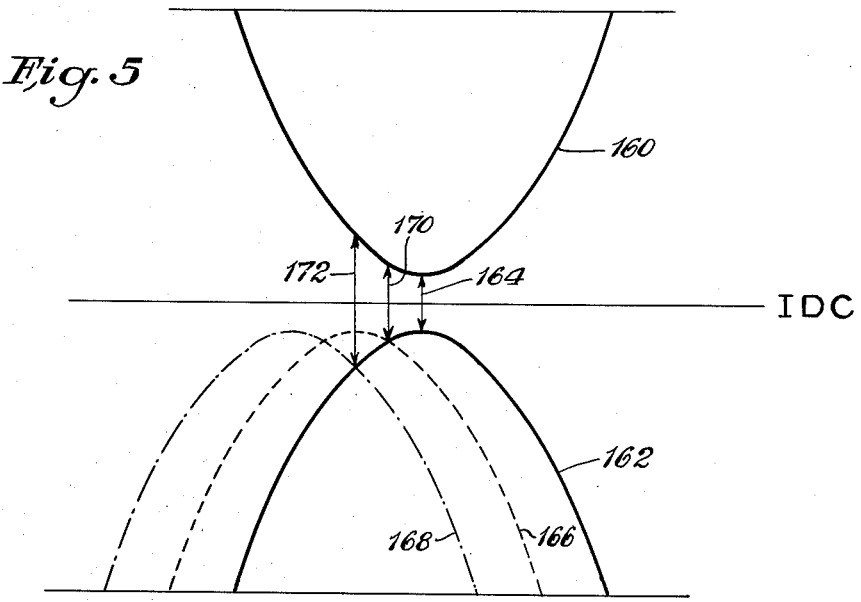
Figure 5 is a piston timing diagram for my invention.

In Figure 1, an opposed piston engine is indicated generally at 10 and has the usual cylinder 12 with an inlet piston 14 and an exhaust piston 16, the inlet piston controlling suitable inlet ports 18 and the usual inlet manifold 20 and the exhaust piston controlling suitable exhaust ports 22 with the usual exhaust manifold 24. The engine has the usual crankshaft, connecting rods, wrist pins, and the like, all of which are conventional and will not be referred to or illustrated in detail.

Inlet air is supplied to the engine by a supercharger 26 which draws in air through a suitable inlet 28, compresses it, and conveys it, through a suitable connection 30, to an intercooler 32 where at least a part of the heat of compression is withdrawn, the intercooler having suitable cooling water inlet and outlet connections 34 and 36. By a connection 38, of any suitable type, the compressed cooled air may be supplied to the inlet manifold, and when the inlet piston uncovers the inlet ports, it enters the cylinders. Fuel, of any suitable type, is supplied to the cylinders by a fuel admitting mechanism 40 and although I have diagrammatically indicated an injection nozzle for diesel fuel, it should be understood that a suitable gas valve and spark plug could be used, if the engine is a gas engine, or a gas valve and injection nozzle could be present if the engine is a dual fuel engine. Therefore, the injector 40 in Figure 1 is merely intended to indicate a fuel admitting means of any suitable type.

After the fuel has been admitted and burned in the cylinder, hot exhaust gases flow out through the exhaust ports 22 when the exhaust piston uncovers them, and an exhaust turbine 42 is connected to the exhaust manifold so that the energy in the hot exhaust gases will be used to drive the inlet air compressor. The exhaust gases can be vented to the atmosphere through any suitable outlet 44.

The cylinder is provided with one or more suitable compression control valves 46 which cover an auxiliary passage 48 communicating with the inlet side at 50. The valve is biased closed by a spring in the usual manner and is opened by a suitably shaped cam 52 on an engine driven shaft 54 through a follower 56 carried by a lever arm 58, the lever arm bearing against a suitable follower 60 on the stem of the control valve. The shaft 54 can be considered as rotating in the direction of the arrow.

The timing of the compression control valve 46 is controlled by a pneumatic mechanism, indicated generally at 62, which includes a cylinder and piston 64 supplied with air from the outlet side of the supercharger by a suitable pipe 66, the piston being biased against the pressure of the air by a suitable spring 68. A lever 70 is connected to the end of the piston rod and carries a control shaft 72 having two control pistons 74 in a control cylinder 75. A source of pressure fluid 76, such as oil from the lubricating oil system, communicates with this cylinder and is controlled by the pistons 74 to admit pressure fluid through the passages 78 into both sides of the piston 80, suitable discharges being indicated at 82 for cylinder 75. The piston 80 carries a rack 84 on its piston rod which meshes with a pinion 86 which positions an eccentric 88 surrounded by a strap 90 on the lever 58. Thus, the pressure of the air supplied by the supercharger will determine the timing of the compression control valve 46 due to the variable positioning of the follower 56 in response to rotation of the eccentric 88.

In Figure 2, I have suggested one timing diagram for the compression control valve. The exhaust port area 22 is indicated at 92 overlying the inlet port area at 94, the exhaust ports being uncovered by the exhaust piston at $a$ ahead of the inlet ports at $b$ and being covered at $d$ after the inlet ports are covered by the inlet piston at $c$.

The compression control valve is adapted to close at $e$ after the exhaust ports have closed at $d$ so that from $d$ to $e$ a predetermined quantity of the entrapped volume in the cylinder will be rejected to the inlet line 30. The cam 52 controlling the compression control valve is such as to open the valve at $f$ immediately after the pistons are at outer dead center.

In Figure 3, I have suggested another timing diagram in which the reference numerals used to indicate the timing of the inlet and exhaust port areas are the same, the inlet piston area being designated by 94, the exhaust by 92. The compression control valve is again closed at $e$ so that, from $d$ to $e$, a substantial quantity of the air normally entrapped for compression will be rejected to the inlet side; however, the control mechanism for the valve is adapted to open the valve at $g$ a substantial distance ahead of outer dead center. Scavenging air will then flow into the cylinder from $g$ to $d$ and cylinder air will be rejected from $d$ to $c$. By an oblique positioning of the valve in the cylinder wall, a swirl can be introduced which can substantially improve the combustion. Thus the auxiliary passage 48 additionally aids proper scavenging in the cylinder and combustion.

It should be understood that the point of opening of the auxiliary passage 48 into the cylinder can be suitably positioned in any location to effect the maximum scavenging.

In Figure 4 I have illustrated a similar type of engine which will not be referred to in detail. The supercharger is indicated at 100 as including a blower 102 which draws in air through a suitable inlet 104 where it is compressed and passed through an intercooler 106 before it is supplied to the inlet ports. The exhaust gases flow from the exhaust ports to a turbine 108 wihch is connected to the compressor and vented to the atmosphere by a suitable exhaust 110.

The crankshafts 112 and 114 are interconnected by suitable gearing 116 which includes a first fixed follower 118, a second fixed follower 120, a first movable follower 122, and a second movable follower 124, which meshes with the driving gear 126 on the crankshaft 112, the first fixed follower meshing with a driving gear 128 on the crankshaft 114. The first movable follower is carried by a lever arm 130, pivoted at 132 on the pivot shaft of the second fixed follower, and is adapted to pivot about the follower shaft. A lever arm 134 carries the second movable follower and is connected to the lever arm 130 by a link 136. Thus the lever 130 and link 136 provide a toggle action with the lever 134.

The levers are manipulated by an actuating mechanism 138 which responds to the load on the engine. As shown, this mechanism includes a first cylinder 140 which responds to the pressure in the inlet manifold through a suitable pipe 142. The piston 144 in this cylinder actuates the lever 146 which controls the master cylinder 148. The control pistons on the shaft 150 determine which side of the actuating piston 152 is placed in communication with a source of pressure fluid 154. The piston 152 is connected by a suitable link 156 to the pivot point 158 between the lever 130 and link 136.

It will be noted that the load responsive actuating mechanism 138 in Figure 4 is similar to and can be the same as the mechanism 62 in Figure 1 except that, instead of the rack 84 as in Figure 1, the piston rod is connected to the pivoted links to change the gear phase relationship between the drive shafts 112 and 114. This gear phase change mechanism is shown more in detail in U.S. Patent No. 2,434,647 and reference is made thereto for details of this mechanism.

The essence of this mechanism is that the phase relationship between the drive shafts on an opposed piston engine are changed and changed in a particular manner. Specifically, the relationship is changed in response to the load on the engine. I construct the mechanism so that as the load increases, the inlet piston is delayed, which is another way of saying that the exhaust piston is advanced. As the load increases, less and less volume of air will be entrapped between the pistons prior to compression and more and more air will be rejected back through the inlet ports. At full load, the minimum volume of air will be entrapped between the pistons prior to compression and at no load a maximum volume of air will be entrapped.

In Figure 5, I have shown a piston timing diagram in which the exhaust piston travel is indicated at 160, the inlet piston being indicated at 162. At no load, the pistons may be exactly in phase and at inner dead center, they will approach each other to produce a minimum combustion space indicated by the arrow 164. As the load increases, the inlet piston will be delayed and the curve 162 will shift to the left in Figure 5. I have indicated two additional positions of the inlet piston, the curves 166 and 168 representing respectively half load and full load. At half load, the inlet piston will be delayed substantially behind the exhaust piston and the combustion space 170 will be increased over the combustion space 164. At full load, the inlet piston follows the curve 168 and the combustion space, indicated by the arrow 172, will be at a maximum.

Figure 6:
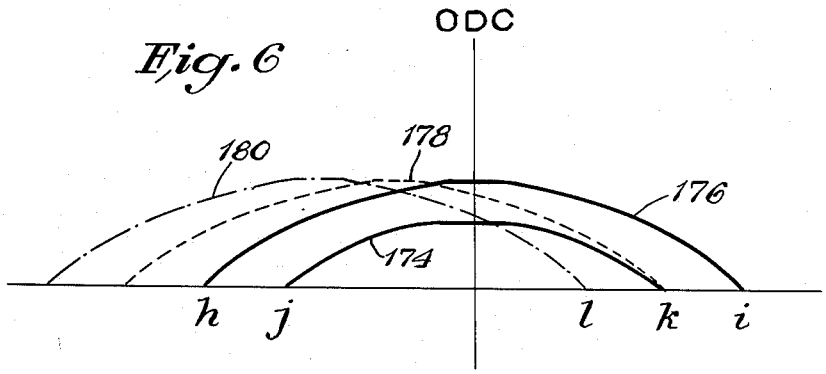
Figure 6 is a port timing diagram for the piston diagram of Figure 5.

In Figure 6, I have indicated the port timing diagram for this engine, the inlet port areas being indicated at 174. The exhaust port areas, in the normal manner, overlie the inlet port areas at 176 so as to open and close at $h$ and $i$ both ahead of and behind the opening and closing of the inlet ports at $j$ and $k$. As the load increases, the exhaust port timing is, in effect, advanced so that at half load, indicated by the curve 178, the time of closing of the exhaust ports approximately coincides with the time of closing of the inlet ports as at $k$. At full load, as represented by the curve 180, the exhaust ports will be advanced a maximum amount ahead of the inlet ports and will close at the point $l$ a substantial amount ahead of the inlet port closing at $k$.

Figure 6 is merely one example and it should be noted in this example that air will be rejected through the inlet ports only from half load to full load although, of course, it should be understood that the engine can be constructed so that rejection through the inlet ports would begin immediately after the load on the engine increased from no load.

It will be realized that whereas I have described and illustrated a practical and operative device and one modification with several other suggestions, nevertheless, many changes may be made in the size, shape, arrangement, number and disposition of parts without departing materially from the spirit of my invention. I wish, therefore, that my showing be taken as in a large sense illustrative or diagrammatic rather than as limiting me to the precise details of my selected forms of illustration.

The use, operation and function of my invention are as follows:

This invention is in the nature of a method of operating an opposed piston engine and an apparatus for carrying out that method so that more load can be carried by a conventional opposed piston engine without exceeding the maximum safe pressure and the maximum thermal stresses.

In both forms of the invention disclosed, as the load increases above a certain minimum, air is rejected to the inlet side of the engine. In the specific examples given, at full load, after the exhaust piston has covered the exhaust ports, means is provided for rejecting a predetermined amount of air from the cylinder back to the inlet side.

In the form of Figure 1, the phase relationship between the drive shaft can remain constant and air is rejected through the control valve 46 to the inlet line between the supercharger and intercooler. A portion of the residual gases may flow through the auxiliary passage back to the inlet side and this hot gas will again be cooled by passage through the intercooler 32.

It should be understood, of course, in Figure 1, that the auxiliary passage 48 could be connected to the inlet side between the intercooler and the inlet manifold and in this case, an auxiliary intercooler could be used to reduce the temperature of the rejected gas. I have found that in both cases, the rejected gas may be filtered, and in this case a suitable filter can be provided in the line before the rejected air is returned to the inlet side.

In Figure 1, I have illustrated one form of mechanism for varying the timing of the control valve and it should be understood that any suitable mechanism can be used which will time the valve in relation to the load on the engine. If the engine is operating as a diesel engine, it is desirable that the control mechanism employed time the valve in inverse relation to the load so that as the load increases, the timing of the valve will be retarded and vice versa. Thus, at no load a minimum amount of air will be rejected through the control valve and sufficiently high pressures and temperatures will be obtained in the combustion space to ignite the fuel. At full load, the maximum amount of air will be rejected and the temperature rise, due alone to compression in the cylinder, will be at a minimum.

If the engine is a gas engine, the mechanism could be quite different and could be adapted to time the closing of the valve in relation to the load so as to entrap a volume of air which, when combined with a gaseous fuel admitted, would produce a constant air-fuel ratio mixture over the entire load range.

In the species of Figure 4, the phase angles between the drive shafts are changed so as to vary both the combustion space and the volume entrapped over the load range. At full load, a minimum volume is entrapped and the maximum combustion space is provided. At no load, the maximum volume is entrapped and the minimum combustion space is provided. As the load increases from no load to full load, the inlet piston is delayed, so that the air rejected from the cylinder returns to the inlet side through the inlet ports, the inlet piston being at its maximum retarded position at full load.

It should be understood that the method and apparatus can function over a selected load range less than from no load to full load and the appended claims should be so interpreted.

I claim:

1. In an opposed piston engine, a cylinder with inlet and exhaust ports in the cylinder wall at opposite ends thereof, exhaust and inlet pistons opposing each other in the cylinder and adapted to open and close the ports, a supercharger and an intercooler connected to the engine for supplying compressed cool air to the cylinder, and load responsive means for varying the phase relationship of the pistons during the cyclical operation of the engine so that at no load and during light loads the exhaust piston will cover the exhaust ports after the inlet piston has covered the inlet ports during the compression stroke so that air will be rejected from the cylinder through the exhaust ports, at a certain intermediate load the exhaust and inlet pistons will cover their ports simultaneously, and at the higher loads and full load, the exhaust piston will cover the exhaust ports before the inlet piston covers the inlet ports so that air will be rejected from the cylinder through the inlet ports.

2. A method of operating an opposed piston engine having a cylinder with inlet and exhaust ports at opposite ends thereof and inlet and exhaust pistons, including the steps of compressing the inlet air to an elevated temperature and pressure, cooling the air while maintaining it at an approximately constant pressure and supplying it to the cylinder through the inlet ports, and varying the phase angle between the pistons at no load and the light loads on the engine so that the exhaust piston will cover the exhaust ports after the inlet piston has covered the inlet ports during the compression stroke to reject air through the exhaust ports, further varying the phase angle as load increases at a certain intermediate load so that the exhaust and inlet pistons will cover their ports simultaneously, and further varying the phase angle between the pistons at the higher loads and full load so that the exhaust piston will cover the exhaust ports before the inlet piston covers the inlet ports to reject air back through the inlet ports.

References Cited in the file of this patent

UNITED STATES PATENTS

| Number | Name | Date |
|---|---|---|
| 1,046,738 | Cross | Dec. 10, 1912 |
| 1,330,496 | Ruegg | Feb. 10, 1920 |
| 1,371,444 | Sherbondy | Mar. 15, 1921 |
| 1,537,128 | Mayer | May 12, 1925 |
| 1,660,610 | Fornaca | Feb. 28, 1928 |
| 1,869,455 | Zaikowsky | Aug. 2, 1932 |
| 2,097,883 | Johansson | Nov. 2, 1937 |
| 2,292,233 | Lysholm | Aug. 4, 1942 |
| 2,401,188 | Prince | May 28, 1946 |
| 2,670,595 | Miller | Mar. 2, 1954 |
| 2,768,616 | Venediger | Oct. 30, 1956 |
| 2,773,490 | Miller | Dec. 11, 1956 |